United States Patent
Kim et al.

(10) Patent No.: US 10,530,696 B2
(45) Date of Patent: Jan. 7, 2020

(54) SYSTEMS AND METHODS FOR GENERATING FILTERING RULES

(71) Applicant: THE BOEING COMPANY, Chicago, IL (US)

(72) Inventors: Hyun J Kim, Irvine, CA (US); Chong Ding, Riverside, CA (US); Karim El Defrawy, Santa Monica, CA (US)

(73) Assignee: THE BOEING COMPANY, Chicago, IL (US)

( * ) Notice: Subject to any disclaimer, the term of this patent is extended or adjusted under 35 U.S.C. 154(b) by 308 days.

(21) Appl. No.: 15/620,428

(22) Filed: Jun. 12, 2017

(65) Prior Publication Data

US 2018/0359188 A1    Dec. 13, 2018

(51) Int. Cl.
| | |
|---|---|
| *G06F 15/16* | (2006.01) |
| *H04L 12/813* | (2013.01) |
| *H04L 12/851* | (2013.01) |
| *H04L 12/24* | (2006.01) |
| *H04L 29/06* | (2006.01) |

(52) U.S. Cl.
CPC .......... *H04L 47/20* (2013.01); *H04L 41/0893* (2013.01); *H04L 47/2441* (2013.01); *H04L 63/0263* (2013.01); *H04L 41/0816* (2013.01); *H04L 41/0883* (2013.01); *H04L 41/22* (2013.01)

(58) Field of Classification Search
CPC . H04L 47/20; H04L 41/0893; H04L 47/2441; H04L 63/0263; H04L 41/0816; H04L 41/0883; H04L 41/22
See application file for complete search history.

(56) References Cited

U.S. PATENT DOCUMENTS

| | | | | |
|---|---|---|---|---|
| 7,970,899 B2 * | 6/2011 | Wiryaman | .............. | H04L 63/20 370/229 |
| 7,987,267 B2 * | 7/2011 | Wiryaman | .............. | H04L 63/20 370/230 |
| 8,069,244 B2 * | 11/2011 | Wiryaman | .............. | H04L 63/20 709/223 |

(Continued)

OTHER PUBLICATIONS

El Defrawy, K., et al., "Optimal Allocation of Filters Against DDoS Attacks", Information Theory and Applications Workshop 2007, pp. 1-10, La Jolla, CA.

(Continued)

*Primary Examiner* — Moustafa M Meky
(74) *Attorney, Agent, or Firm* — Moore IP Law

(57) ABSTRACT

Systems and methods for generating filtering rules are provided. One computer implemented method includes receiving a command to modify existing network traffic rules. The method further includes performing a quality calculation for the existing network traffic rules, the quality calculation being a function of a number of distinct flows permitted by a particular rule, wherein (i) if the command to the network is to increase the number of rules, then identifying a rule of the existing network traffic rules with a highest quality calculation, splitting the rule into sub-rules and adding a new rule, and (ii) if the command to the network is to decrease the number of rules, then identifying the existing network traffic rules with quality rule calculations near a predetermined value, adding new rules, and merging the new rules to the identified rules with quality rule calculations near the predetermined value.

20 Claims, 7 Drawing Sheets

(56) References Cited

U.S. PATENT DOCUMENTS

| | | | | |
|---|---|---|---|---|
| 9,424,521 B2* | 8/2016 | Bloomquist | ............. | G06N 5/02 |
| 9,471,407 B2* | 10/2016 | Laval | ................ | G05B 23/0272 |
| 10,091,276 B2* | 10/2018 | Bloomquist | ........... | G06Q 10/06 |
| 2004/0104302 A1* | 6/2004 | Schierenbeck | ........ | B64D 27/00 |
| | | | | 244/10 |
| 2011/0218701 A1* | 9/2011 | Ric | .................... | H04L 63/0245 |
| | | | | 701/31.4 |
| 2013/0304420 A1* | 11/2013 | Laval | ................ | G05B 23/0272 |
| | | | | 702/184 |
| 2016/0337441 A1* | 11/2016 | Bloomquist | ........... | G06Q 10/06 |
| 2016/0358084 A1* | 12/2016 | Bloomquist | ............. | G06N 5/02 |
| 2018/0054418 A1* | 2/2018 | El Defrawy | ........ | H04L 63/0236 |
| 2019/0028534 A1* | 1/2019 | Bloomquist | ........... | G06Q 10/06 |

OTHER PUBLICATIONS

Soldo F., et al., "Filtering Sources of Unwanted Traffic", Information Theory and Applications Workshop 2008, pp. 1-10, San Diego, CA.

Soldo F., et al., "Optimal Filtering of Source Address Prefixes: Models and Algorithms", INFOCOM 2009, IEEE, pp. 2446-2454, Rio de Janeiro, Brazil.

Pozo S., et al "MDA-Based Framework for Automatic Generation of Consistent Firewall ACLs with NAT," ICCSA Part II, Jun. 2009, pp. 130-144, LNCS 5593.

\* cited by examiner

SYSTEMS AND METHODS FOR GENERATING FILTERING RULES

BACKGROUND

The present disclosure relates in general to systems and methods for generating filtering rules, particularly traffic filtering rules.

Human experts and network designers of cyber-physical systems (CPSs), such as for airplanes, may wish to update an existing set of the filtering rules and increase the number of rules such that the overall security of a CPS is enhanced (e.g., tighter rules to filter out unwanted traffic compared to original rule set) without sacrificing the computational overhead. Conventional approaches to regenerating the set of the filtering rules require humans to manually go through all the existing rules and modify the rules to meet the new requirement in terms of the number of rules and the security. Thus, modifying network filtering rules using conventional approaches is time consuming because each time a network administrator wants to change the number of network rules for filtering network traffic, the administrator must modify every existing rule according to the desired changes.

SUMMARY

In one embodiment, a computer implemented method for regenerating traffic filtering rules is provided. The method includes receiving a command to modify existing network traffic rules and identifying whether the command is an instruction to increase or decrease a number of network traffic rules. The method further includes performing a quality calculation for the existing network traffic rules, the quality calculation being a function of a number of distinct flows permitted by a particular rule, wherein (i) if the command to the network is to increase the number of rules, then identifying a rule of the existing network traffic rules with a highest quality calculation, splitting the rule into sub-rules and adding a new rule, and (ii) if the command to the network is to decrease the number of rules, then identifying the existing network traffic rules with quality rule calculations near a predetermined value, adding new rules, and merging the new rules to the identified rules with quality rule calculations near the predetermined value.

In another embodiment, a computing device is provided that includes a user interface having a user input to receive a command to modify a set of traffic filtering rules and a filtering rule generator having a generation module. The generation module is configured to identify traffic filtering rules using a defined quality metric, select a subset of the traffic filtering rules using the defined quality metric, and regenerate the set of traffic filtering rules as a new set of traffic filtering rules using only the selected subset of the traffic filtering rules to merge or split at least some of the traffic filtering rules in the subset of traffic filtering rules.

In another embodiment, a computer implemented aircraft data traffic flow filtering method is provided. The method includes determining with a computing device, a subset of traffic filtering rules from an entire set of traffic filtering rules that satisfy a quality metric defined by a ratio related to a number of distinct data flows for each of the traffic filtering rules. The method further includes regenerating a new set of traffic filtering rules by merging or splitting traffic filtering rules only within the subset of traffic filtering rules.

DETAILED DESCRIPTION

Figure 1:
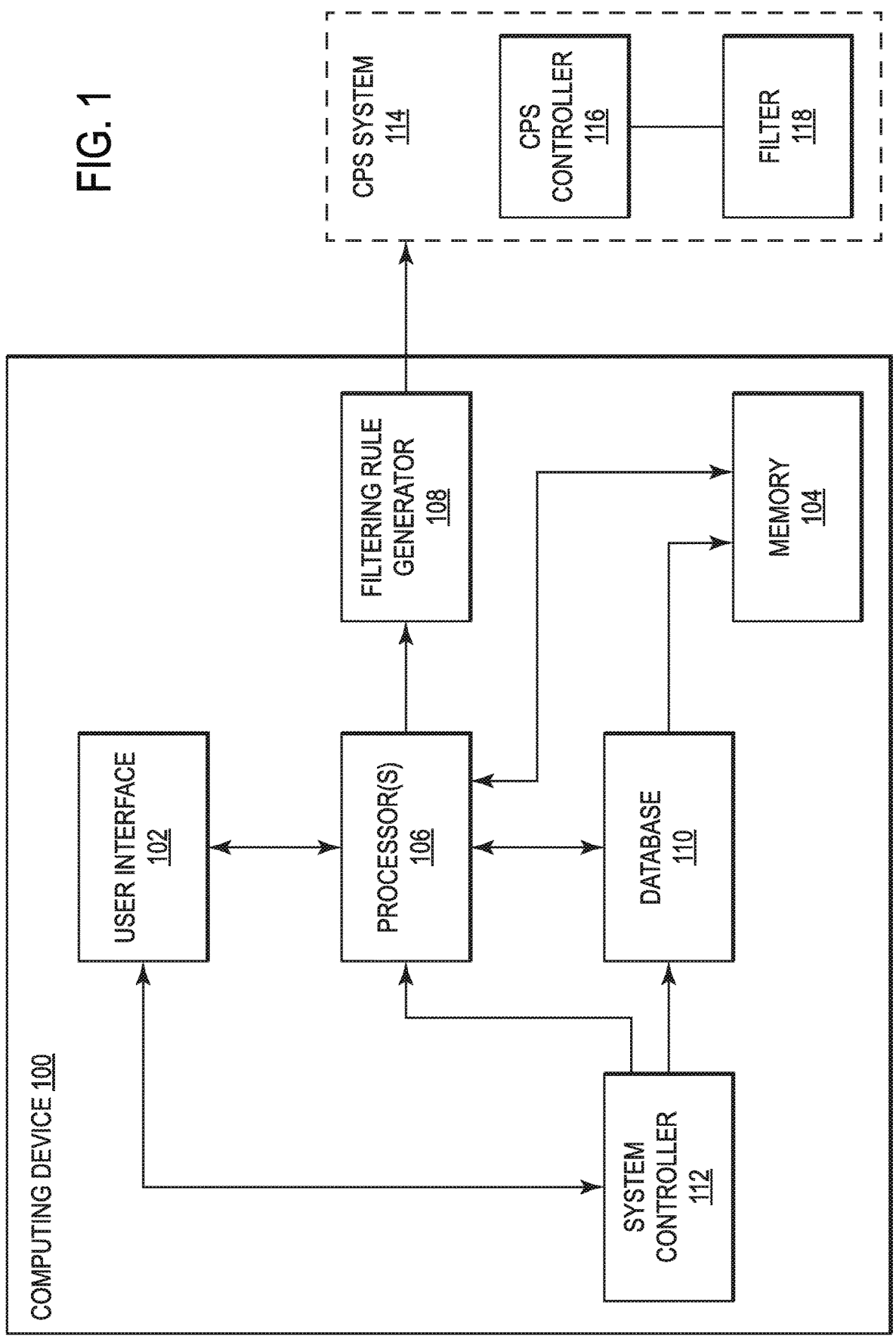
FIG. 1 is a block diagram illustrating a computing device to generate filtering rules in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

Various embodiments provide systems and methods for generating filtering rules, including regenerating traffic filtering rules, such as based on desired or required system security. For example, various embodiments allow for the regeneration of filtering rules for CPSs, such as for network systems for aircrafts, when a change in overall system security is desired or needed. In some embodiments, an automated solution identifies and modifies only the loosest rule(s) (e.g., rules that allow the most amount of unwanted traffic or have the lowest security filtering) without revisiting every rule in the set. Thus, systems and methods of various embodiments can automatically modify a subset of existing network traffic filtering rules such that the overall number of filtering rules increases marginally (e.g., by a few rules), the exact number of which is provided by a human operator, while enhancing the overall security of the system to reduce the amount of unwanted traffic from proceeding and getting into the internal system.

More particularly, in various embodiments, a computing device 100 may be used to process existing data traffic filtering rules and regenerate a new set of rules without analyzing all of the rules in the original rule set. A user may operate the computing device 100 in various embodiments, such as to define an overall system security level or a change in the overall system security level (or some other change). In some embodiments, the computing device 100 may be used to regenerate data traffic filtering rules for an aircraft data or control system.

While some embodiments are illustrated and described herein with reference to the computing device 100 being a computer system and/or a server, embodiments are operable with any device that generates and/or controls data traffic filtering, such as for an aircraft data network. For example, the computing device 100 may be or include a tablet, netbook, laptop, desktop personal computer, computing pad, industrial control devices, aircraft control devices, and other computing devices. The computing device 100 may represent a group of processing units or other computing devices. The computing device 100, in some embodiments, includes a user interface device 102 for exchanging data between the computing device 100 and the user, computer-readable media, and/or another computing device (not shown). In at least some embodiments, the user interface device 102 is coupled to or includes a display or other presentation device that presents information, such as text, images, audio, video, graphics, and the like, to the user. For example, the user interface device 102 may include a display (which may be touchscreen), user input (e.g., keyboard and mouse) and speaker. Thus, the user interface device 102 allows user input and is configured to receive information, such as user commands, from the user. In some embodiments, the presentation device and the input device may be integrated in a common user-interface device configured to present information to the user and/or receive information from the user.

The computing device 100 includes one or more computer-readable media, such as a memory 104 (e.g., a memory area) storing computer-executable instructions, video or image data, and/or other data, and one or more processors 106 programmed to execute the computer-executable instructions for implementing embodiments disclosed herein. For example, the memory 104 may store one or more computer-executable components for generating and controlling data traffic filtering rules. The memory 104 includes any type or amount of media associated with or accessible by the computing device 100, and may be internal to the computing device 100 or external to the computing device 100, or both.

In some embodiments, the memory stores, among other data, one or more applications or programs. The applications or programs, when executed by the processor 106, operate to perform functionality on the computing device 100. For example, the applications or programs may include filtering rule programs or systems that control data traffic flow in a computer system or network (e.g., a network of computing or communication systems within an aircraft). The applications may communicate with other applications or services such as remote services accessible via a network.

The processor 106 includes any type and number of processing units, and the instructions may be performed by the processor 106 or by multiple processors within the computing device 100 or performed by a processor external to the computing device 100. The processors 106 can perform the instructions in parallel or series. In various embodiments, the processor 106 is programmed to execute instructions such as those illustrated in the figures (e.g., FIGS. 2 and 5).

The processor 106 is transformed into a special purpose microprocessor by executing computer-executable instructions or by otherwise being programmed. For example, the processor 106 may execute the computer-executable instructions to access a set of data traffic filtering rules (such as from a database 110, which may be stored in the memory 104), identify a subset of rules to regenerate based on a user input (e.g., an input changing a data or communication security level of an overall system or a number of desired rules), and regenerate a new set of data traffic filtering rules by processing only the subset of rules. In some embodiments, the processor 106 controls a filtering rule generator 108, which may be performed by executing computer-executable instructions on the processor 106, or which may include processing by another processor or processing device. It should be noted that although the processor 106 is shown separate from the memory 104, embodiments contemplate that the memory 104 may form part of (e.g., be onboard) the processor 106.

In various embodiments, the database 110 is a comprehensive database that is software loadable and utilized by the computing device 100 to generate or regenerate traffic filtering rules. The database 110 may be populated with various types of data that can be implemented or operated during the execution of combinational logic. For example, the database 110 can include such data as numerical data (data), logic statements (LS) and/or expressions (EXP), e.g. state programs, algorithms and equations. The database 110 allows the computing device 100 to define or redefine (e.g., regenerate) stored data traffic filtering rules.

In one embodiment, the contents of the database 110 (which may include one or more sets of traffic filtering rules) are downloaded during initiation of a traffic filtering regeneration session or pre-flight routine, into the memory 104. In another embodiment, a copy of the data in the database 110 may be provided and maintained in a central computer system. In yet another embodiment, the data in the database 110 (or portions thereof) may be updated during the traffic filtering regeneration session or pre-flight routine from the central computer system.

The computing device 100 in various embodiments generates data traffic filtering rules that may be used to control a CPS, referred to herein as a CPS system 114. For example, the computing device 100 in various embodiments includes a system controller 112 that controls one or more aspects or components of the computing device 100 to allow an interface with the CPS system 114, which may include a security interface to filter data traffic to, from or within the CPS system 114. It should be noted that the CPS system 114 may be embodied as one or more different systems or subsystems onboard an aircraft that control different operations or aspects of the aircraft (e.g., flight or communication control) with data traffic flow controlled in part by a filter 118.

The system controller 112 can provide overall control of the interface operations to/from the various systems or subsystems in order to control the generation or regeneration of data traffic filtering rules. Communication between the various components illustrated in FIG. 1 may be provided via a wide band communication link, such as, for example, an Ethernet type communication bus or, in some embodiments, via a wireless communication link. In some embodiments, a network communication interface exchanges data between the computing device 100 and a computer-readable media, the CPS system 114, or another computing device (not shown). In at least some embodiments, the network communication interface transmits data traffic filtering rules to control data traffic in the CPS system 114.

The CPS system 114 in the illustrated embodiment includes a CPS controller 116, which may form part of or be embodied as a particular embodiment of an aircraft control system. It should be noted that multiple CPS systems 114 and/or multiple CPS controllers 116 may be provided, such as to control functionality or aspects in different portions of the aircraft.

In operation, in various embodiments, data traffic in the CPS system 114 is controlled or filtered by the filter 118 based on traffic filtering rules that are generated or regenerated in accordance with one or more embodiments described herein. For example, traffic filtering rules are administered by the CPS controller 116 based on filtering rules from the filtering rule generator 108.

The block diagram of FIG. 1 is merely illustrative of one system that may be used in connection with one or more examples of the disclosure and is not intended to be limiting in any way. Further, some peripherals or components of the computing device 100 known in the art are not shown, but are operable with the various embodiments. At least a portion of the functionality of the various elements in FIG. 1 may be performed by other elements in FIG. 1, or an entity (e.g., processor, web service, server, application program, computing device, etc.) not shown in FIG. 1.

Figure 2:
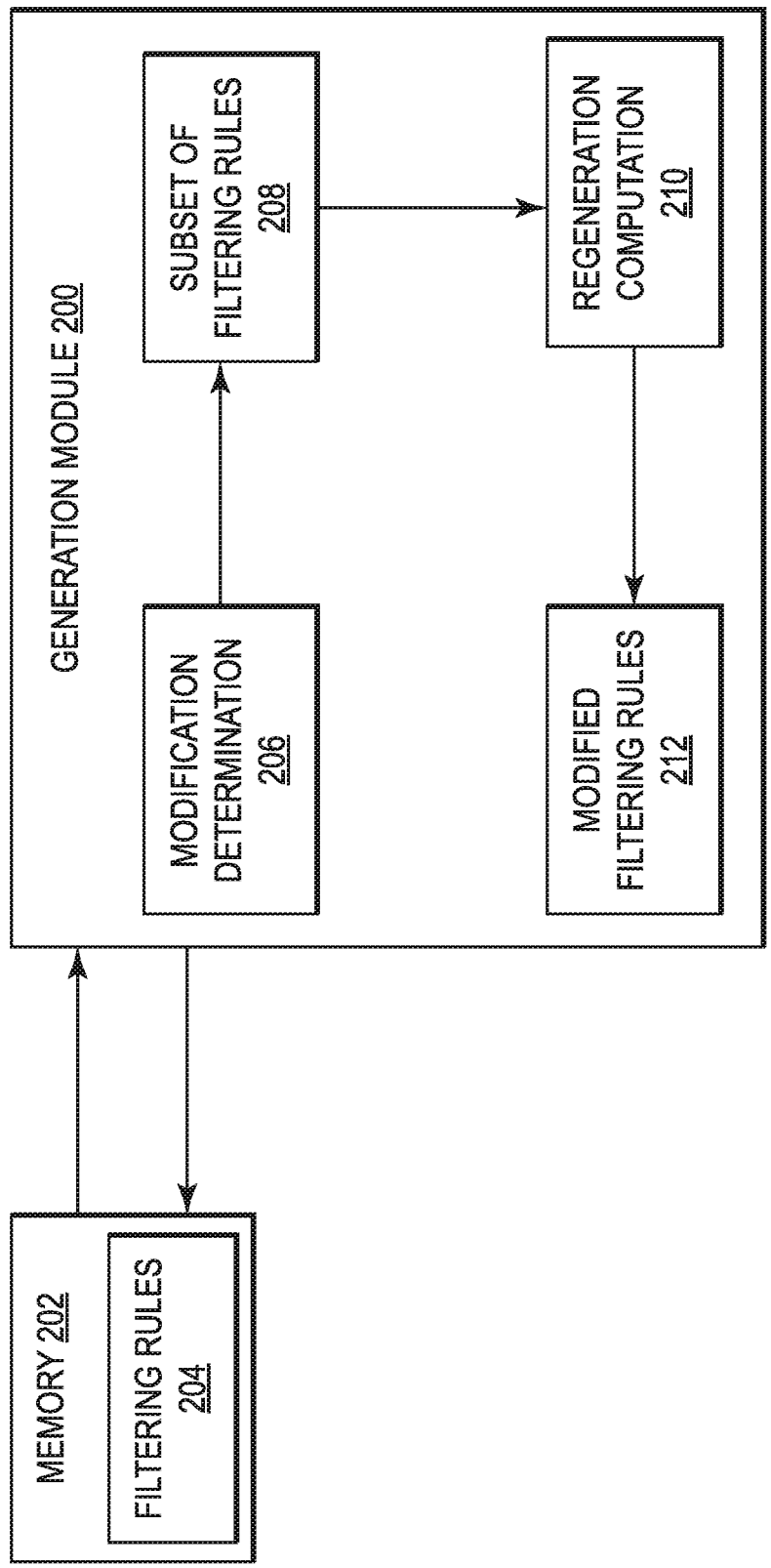
FIG. 2 is a block diagram illustrating a generation module in accordance with an embodiment.

To efficiently generate or regenerate data traffic rules, a generation module 200 as shown in FIG. 2 is configured to perform various aspects described herein. The generation module 200 may be embodied as or form part of the filtering rule generator 108 (shown in FIG. 1) in some embodiments. The generation module 200 in some embodiments accesses a memory 202 storing data traffic filtering rules 204 (e.g., existing data traffic filtering rules) in order to regenerate the data traffic filtering rules 204 to change an overall system security. For example, the computing device 100 is configured to implement data traffic generation processes or operations, including regenerating the filtering rules 204 by processing a subset of the entire set of rules that define the filtering rules 204.

In the illustrated embodiment, the generation module 200 is configured to perform a traffic rule modification determination at 206, which includes identifying and outputting a subset 208 of the filtering rules for use in regenerating the filtering rules 204. As described herein, the generation module 200 uses a quality variable or quality calculation (in one embodiment, quality being an indicator of the number of distinct flows allowed by a network rule) to identify rules to be merged or removed based on a user's (network administrator's) desire or need to increase or decrease the number of network traffic rules for a network.

The identified rules, which define the subset of filtering rules, are processed by regeneration computations at 210 to increase or decrease the number of filtering rules (e.g., network filtering rules) without modifying every existing network rule. The generation module 200 uses a calculation of the quality of a specific rule. In one embodiment, this quality variable is a function of the number of distinct flows allowed by a particular rule as defined as: $Q(r)=n/m$, where r is the rule, n is the number of distinct flows allowed by r, and m is the number of distinct flows desired by the network. Thus, based on the user's desire to increase or decrease the number of rules (such as to change the overall security level of the network), the generation module 200 is configured to identify the rules having either higher or lower Q values, or Q values close to a predetermined value (e.g., 1). In particular, the more that n is greater than m or vice versa, the looser or less strict the rule is with respect to controlling data traffic flow. Thus, rules having the highest or lowest Q values (i.e., the rules that have a value farther from 1) are determined by the generation module 200 to be the best candidates for use in the regeneration computation at 210 in some embodiments (e.g., best rules for merging). In other embodiments, rules having a Q value closest to 1 are determined by the generation module 200 to be the best candidates for use in the regeneration computation at 210 (e.g., best rules for splitting). Using the Q value for selection criteria, the generation module 200 in various embodiments performs traffic filtering rule without processing each and every rule in an existing rule set.

Figure 3:
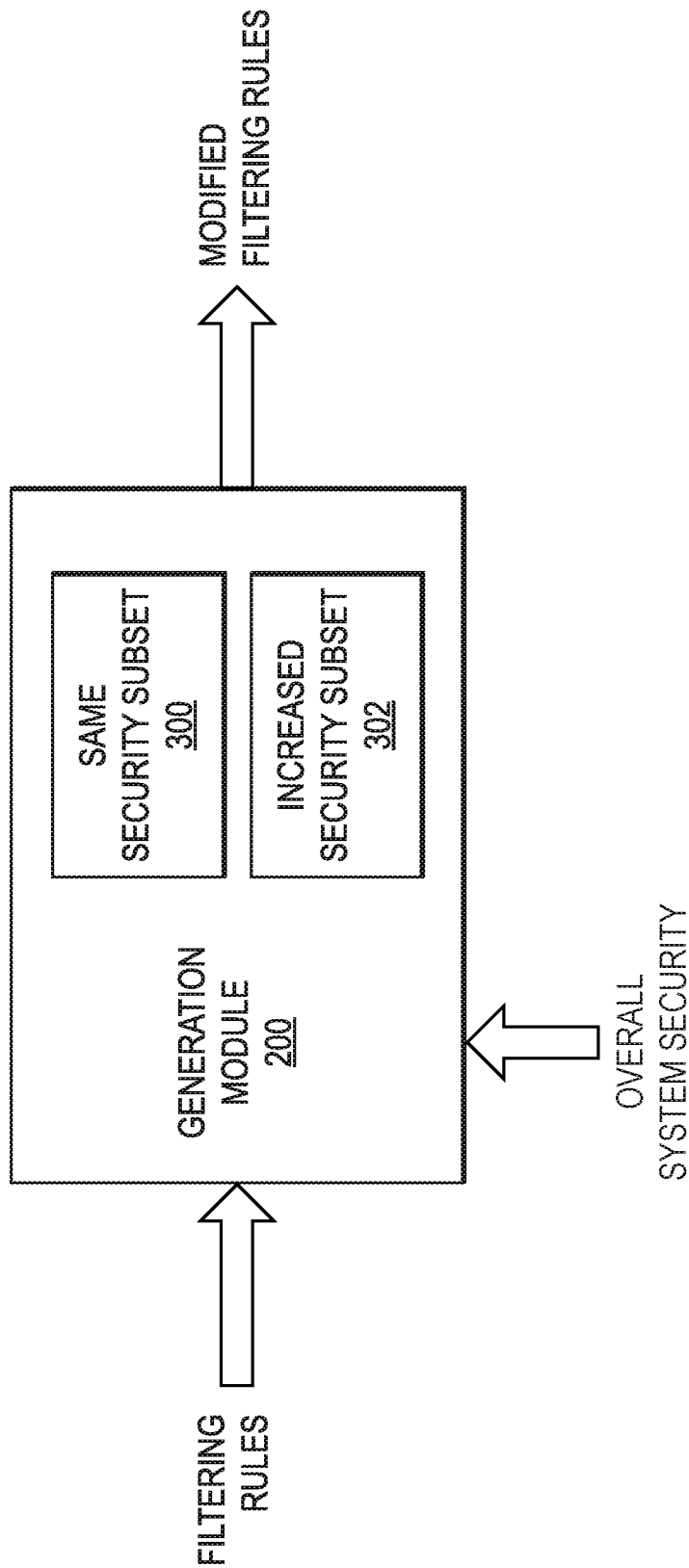
FIG. 3 is a block diagram illustrating operation of a generation module in accordance with an embodiment.

Once identified, the generation module 200 is configured to combine or remove new rules by merging or splitting the existing rules and the new rules in a modified filtering rules generating process at 212. For example, in some embodiments, the generation module 200 accesses a current set of traffic filtering rules as shown in FIG. 3 to identify a subset 300 of rules that are not going to be processed (such that these rules define a same security level) and a subset 302 of rules that are going to be processed, such that the traffic filtering rules regeneration process modifies at least some of these rules to change the overall security of the system or network. Thus, the generation module 200 generates modified filtering rules that are consistent with a desired or required change as defined by a user.

Figure 4:
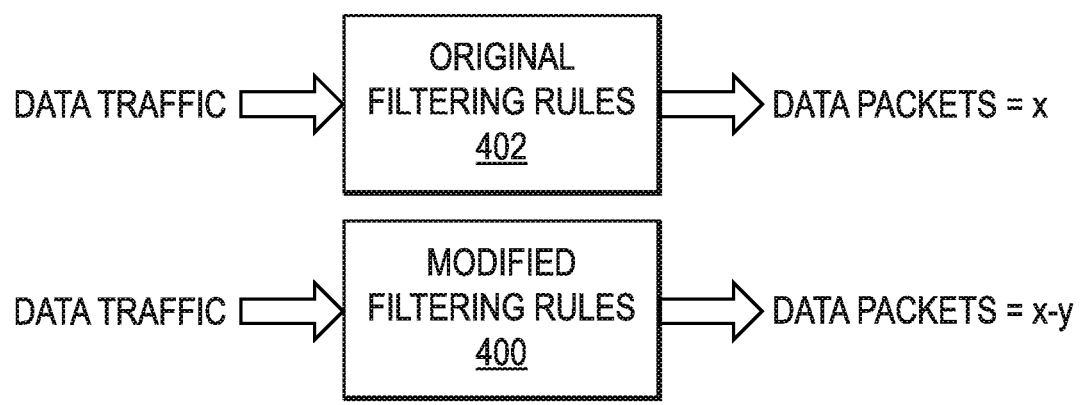
FIG. 4 is a block diagram illustrating regeneration of data traffic filtering rules in accordance with an embodiment.

In one embodiment, the generation module 200 is configured to perform a computer implemented method for regenerating network traffic flow rules that includes:

(1) receiving a command to modify existing network traffic rules;

(2) identifying whether the command is an instruction to increase or decrease the number of network traffic rules; and (3) performing an existing rule quality calculation, wherein the quality calculation (i.e., Q value as described herein) is a function of the number of distinct flows permitted by a particular rule. If the command to the network is to increase the number of rules, then the generation module 200 identifies the existing rule with the highest quality calculation, splits the rule into sub-rules and adds the new rules with the updated quality computations. If the command to the network is to decrease the number of rules, the generation module 200 then identifies existing rules with quality calculations near 1 and merges the new rules. This merging or splitting step may be repeated until the desired number of rules are satisfied. Thus, given a set of existing filtering rules for network traffic, the generation module 200 automatically re-generates and/or re-processes a subset of filtering rules for network traffic to meet the requirement in the number of rules approved by a user, such as a human analyst, for enhanced security (e.g., tighten rules to reduce the amount of unwanted traffic from proceeding as illustrated in FIG. 4).

In various embodiments, a filtering rule defines the ranges of source and destination Internet Protocol (IP) addresses, as well as port numbers, traffic type, etc., such that only the incoming traffic that satisfies the rule is allowed to proceed. As shown in FIG. 4, the modified filtering rules 400 allow less data flow (less flow of data packets) by a factor "y" than the original filtering rules 402. The factor "y" in various embodiments can be a user defined value used to tighten or make stricter the traffic flow requirements, or to adjust other filtering properties or characteristics of the system. It should be appreciated that in various embodiments, the modified filtering rules may allow more data flows if desired or needed. Thus, "y" may be "+y" or "−y".

By practicing some embodiments, the number of filtering rules to process is decreased or minimized, thereby resulting in a decrease in computational overhead and lowering a likelihood of delays because incoming traffic only needs to be compared to the smaller number of rules. However, in various embodiments, the number of rules cannot be too low (from an overall security standpoint), in which case most traffic goes through, thereby evading the purpose of having the filtering rules. It should be appreciate that there may be special occasions or circumstances when the user or operator wishes to allow a small number of additional rules on the existing filtering rule configuration to strengthen the overall security of the system(s), or reduce the number of rules to enhance the overall performance of flow-to-rule comparison. By practicing various embodiments, all existing rules are not reevaluated to re-distribute the IP address and port ranges on traffic rules. Instead, the generation module 200 reduces or minimizes the number of revisited rules, while reducing or minimizing the false positive rate of allowing disallowed traffic to pass, such that both the regeneration process and the modified rule set provides computational efficiency.

Accordingly, various embodiments may be provided as a tool in a network security workflow, and in the process of designing internal networking and communication infrastructure in different platforms (e.g., airplanes, rotorcraft, unmanned aerial vehicles (UAVs), etc.). Instead of having human experts spend hours reviewing the existing network traffic rules and modifying the rules manually, the generation module 200 automatically identifies and updates certain rules, such as the loosest rule(s), to increase or tightly restrict and control the incoming network traffic, or vice versa. Thus, the generation module 200 automatically and efficiently re-generates network traffic filtering rules, given some feedback from human operators, does not require recomputing of all the rules and does not require all the traffic capture flows to be revisited.

Figure 5:
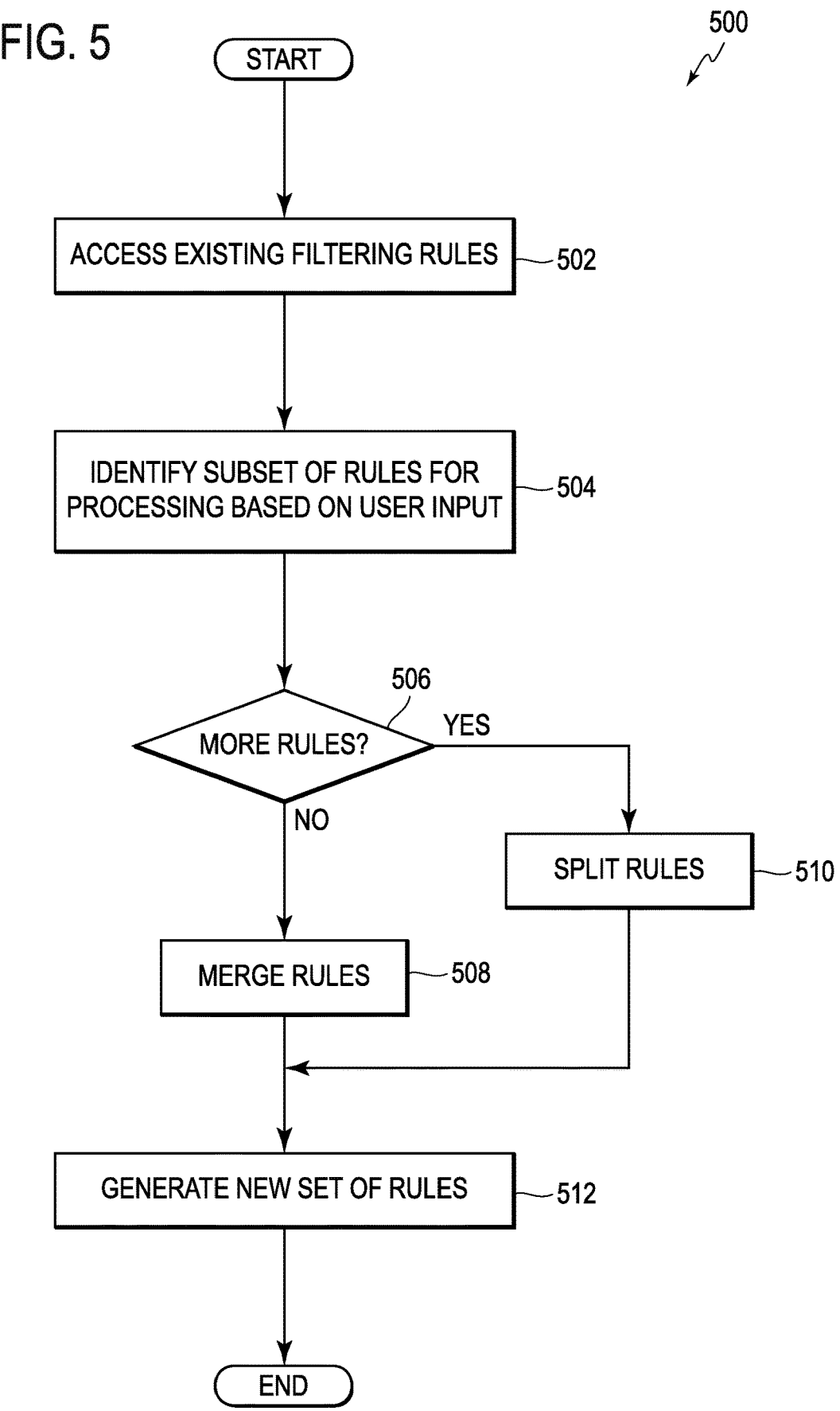
FIG. 5 is a block diagram of a method for generating or modifying data traffic filtering rules in accordance with an embodiment.

A method 500 for regenerating traffic filtering rules (such as on the disclosed hardware architecture) is illustrated in FIG. 5. It should be appreciated that the method 500 may be implemented by one or more the embodiments disclosed herein, which may be combined or modified as desired or needed. Additionally, the steps in the method 500 may be modified, changed in order, performed differently, performed sequentially, concurrently or simultaneously, or otherwise modified as desired or needed.

In various embodiments, given a set of existing filtering rules for network traffic, the method 500 automatically re-generates and/or re-processes a subset of filtering rules for network traffic to meet a requirement in the number of rules approved by a human analyst for enhanced security (e.g., tighten rules to reduce the amount of unwanted traffic from proceeding). As described herein, a filtering rule defines the ranges of source and destination IP addresses, as well as port numbers, traffic type, etc., such that only the incoming traffic that satisfies the rule is allowed to proceed. In some embodiments, the method 500 automatically identifies and updates the loosest or least strict rule(s) to restrict and control the incoming network traffic. For example, the method 500 automatically re-generates traffic filtering rules given certain constraints in an efficient manner, for example a number of additional rules that are allowed for the system to strengthen the security of the overall filtering rules, such that the re-generation process does not revisit every existing rule.

The method 500 includes accessing existing or stored filter rules at 502. For example, an entire set of filtering rules for a network, system or subsystem that are to be modified are accessed. In some embodiments, the set of filtering rules are to be modified such that the overall system security or data flow performance is changed. Thus, the method 500 allows for updating an existing set of filtering rules, such that an existing filtering rule configuration is modified to strengthen the overall security of the system or enhance the overall performance of the system.

The method includes identifying a subset of rules from the entire set of rules for processing to regenerate a new set of data traffic filtering rules that achieves a desired or required overall security or system performance. In particular, and without loss of generality, let a flow be composed of source and destination IP addresses, and source and destination ports as follows: [SRC_IP, SRC_PORT, DST_IP, DST_PORT]. Network traffic flows are observable from packet captures (pcaps). The method 500 assumes that there exists ground-truth pcaps that are composed of flows that are allowed to access the network. At 504, in some embodiments, the method 500 identifies a filtering rule as a flow tuple as described above, in which case the number of filtering rules for a given system may be too high.

In other embodiments, a rule can also be represented using ranges of source and destination IP addresses and ranges of source and destination port numbers as follows: [SRC_IP_RANGE, SRC_PORT_RANGE, DST_IP_RANGE, DST_PORT_RANGE]. Using ranges can significantly reduce the number of filtering rules to meet the system requirement. However, this process may allow unwanted traffic to bypass the filtering rule. For example, an enterprise network may require up to 100 filtering rules to efficiently handle the flow-to-rule comparison with tolerable false positive rates (i.e., flows that are supposed to be blocked from accessing the network but gets into the network). Let r be a filtering rule that allows flows from source IP addresses in SRC_IP_RANGE with port numbers in SRC_PORT_RANGE to destination IP addresses in DST_IP_RANGE with port numbers in DST_PORT_RANGE for some network A as follows: r=[SRC_IP_RANGE, SRC_PORT_RANGE, DST_IP_RANGE, DST_PORT_RANGE]. Let n be the number of distinct flows that r allows through, and m be the number of distinct flows that network A desires to allow through.

Accordingly, the quality of a constructed filtering rule is measured as follows to identify the subset of rules for use in regenerating the new traffic rules: $Q(r)=n/m$.

In various embodiments, it is recognized that it is desirable to have $Q(r)$ close to 1, which indicates that r is tight, namely having an appropriate or desired security level, without allowing unwanted flows to network A. A $Q(r)>1$ indicates that r allows unwanted flows to access network A. Thus, the larger the value of $Q(r)$, the more likely the rule allows unwanted traffic into the network.

In order to further identify rules for processing, the method defines two criteria factors for each rule r:

1. m indicates the number of distinct flows that network A desires to allow through.
2. $Q(r)$ indicates the quality of the rule r.

Then, a rule r is represented as follows: r=[SRC_IP_RANGE, SRC_PORT_RANGE, DST_IP_RANGE, DST_PORT_RANGE, m, $Q(r)$]. When the network A's human operator desires to change the total number of rules from i to j, then the following steps are performed:

1. If i=j, nothing needs to be updated. That is, the number of rules is to be unchanged. If i does not equal j, the a determination is made at 506 whether less rules or more rules are desired, which generally corresponds to lower overall system security (but the increased performance) and higher overall system security (but the potential for decreased overall system performance), respectively.

In particular, if i>j, this indicates that the operator wishes to decrease the total number of rules for A. Then, one or more sets of two rules $r_a$ and $r_b$ whose $Q(r_a)$ and $Q(r_b)$ that are the closest to 1 are identified. At 508, the rules are merged, namely the method 500 merges $r_a$ and $r_b$ to $r_{a+b}$, such that the merged source and destination IP addresses and port numbers span over both rules: $r_{a+b}$=[SRC_IP_RANGE$_{a+b}$, SRC_PORT_RANGE$_{a+b}$, DST_IP_RANGE$_{a+b}$, DST_PORT_RANGE$_{a+b}$, $m_{a+b}$, $Q(r_{a+b})$], where:

SRC_IP_RANGE$_{a+b}$=SRC_IP_RANGE$_a$∪SRC_IP_RANGE$_b$,

SRC_PORT*P*_RANGE$_{a+b}$=SRC_PORT_RANGE*a*∪
SRC_PORT_RANGE$_b$,

DST_IP_RANGE$_{a+b}$=DST_IP_RANGE$_a$∪DST_IP_RANGE$_b$,

DST_PORT_RANGE$_{a+b}$=DST_PORT_RANGE*a*∪DST_PORT_RANGE$_b$.

At 508, $m_{a+b}=m_a \, m_b$, and the method 500 defines x to be the size of SRC_IP_RANGE$_{a+b}$, y to be the size of SRC_PORT_RANGE$_{a+b}$, z to be the size of DST_IP_RANGE$_{a+b}$, and w to be the size of DST_PORT_RANGE$_{a+b}$. Then $Q(r_{a+b})=x*y*z*w/m_a+_b$.

Thus, at 508, a subset of rules, such as a subset of best candidates for merging are selected. In various embodiments, the above-described process begins by selecting the two rules having a Q(r) value closest to 1, and then the next two rules with the closest values, and so on, until a desired or required number of rules is reached. The merging of rules at 508 allows for these rules then to be merged such that an original number of rules is reduced to a desired number of rules based on a Q(r) value metric or criteria (e.g., by merging source and destination IP ranges).

If i<j, this indicates that the operator wishes to increase the total number of rules for A, for example, to enhance system security. Then, one or more rules ra whose Q(ra) is the highest among all rules for A are identified. At 510, ra is split into sub-rules as follows:

Review the ground-truth pcaps and identify flows in SRC_IP_RANGE$_a$,

SRC_PORT_RANGEa, DST_IP_RANGE$_a$, and DST_PORT_RANGE$_a$. Let each flow become a rule r' and let 1 be the number of rules with Q(r')=1.

Repeat the following step until 1<=(j-i) or no further merging can be processed: Among rules with the same source and destination IP addresses, select two rules, $r_1$ and $r_2$, with the most nearby ports (either source port or destination port). Merge the rules into a new rule $r_{1+2}$. Let x be the size of the merged port range. Then $m_{1+2}=m_1+m_z$, and $Q(r_{1+2})=x/m_{1+2}$.

If 1<=(j-i), repeat the following step until 1<=(j-i) or no further merging can be processed: Among rules with the same source IP address, select two rules, $r_1$ and $r_2$ with the most nearby destination IP addresses. Merge the rules into a new rule $r_{1+2}$. Let x be the size of SRC_PORT_RANGE$_{1+2}$, let y be the size of DST_IP_RANGE$_{1+2}$, and let z be the size of DST_PORT_RANGE$_{1+2}$. Then $m_{1+2}=m_1+m_2$, and $Q(r_{1+2})=x*y*z/m_{1+2}$.

If 1<=(j-i), repeat the following step until 1<=(j-i) or no further merging can be processed: Select two rules, $r_1$ and $r_2$, with the most nearby source IP addresses. Merge the rules into a new rule. Let x be the size of SRC_IP_RANGE$_{1+2}$, let y be the size of SRC_PORT_RANGE$_{1+2}$, let z be the size of DST_IP_RANGE$_{1+2}$, and let w be the size of DST_PORT_RANGE$_{1+2}$. Then $m_{1+2}=m_1+m_2$, and $Q(r_{1+2})=x*y*z*w/m_{1+2}$.

If 1<=(j-i) after the above process is performed, then splitting the rules at 510 is repeated.

The method 500 then generates a new set of rules at 512. For example, a set of rules having a reduced number of rules or an increased number of rules is generated without processing every rule in the original or existing rule set. Thus, the method 500 uses the Q(r) metric to select the best candidates of rules for merging or splitting. It should be noted that any suitable method for merging or splitting rules may be used, including any traffic rule combination or separation process.

Various embodiments regenerate traffic filtering rules to, for example, remove unwanted traffic or change security restrictions. For example, the various embodiments may be used to regenerate traffic filtering rules in highly networked systems, such as onboard an airplane, which may include regenerating the traffic filtering rules based on different factors, such as user requirements, passenger requirements, or different vendor or airplane requirements. By regenerating the traffic filtering rules, a new set of rules results that provide an improved balance between security and hardware requirements.

The various embodiments may be implemented in connection with different computing systems. Thus, while a particular computing or operating environment may be described herein, the computing or operating environment is intended to illustrate operations or processes that may be implemented, performed, and/or applied to a variety of different computing or operating environments.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 6:
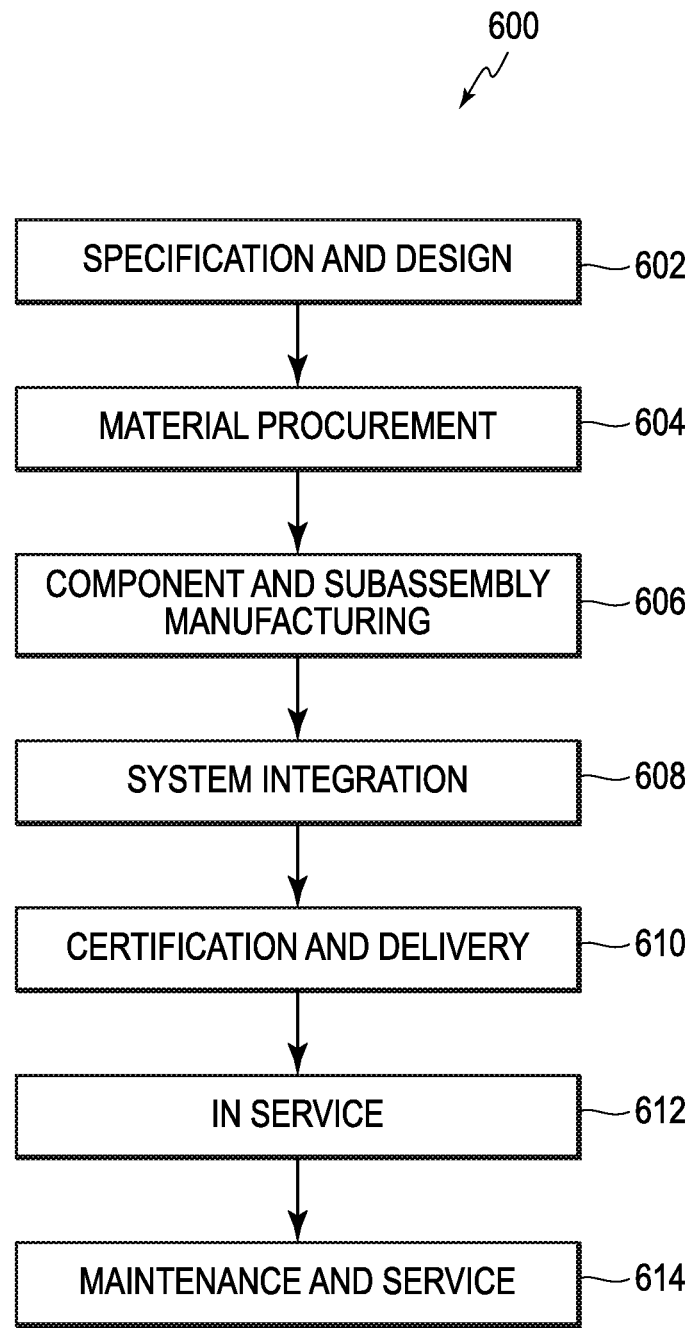
FIG. 6 is a block diagram of aircraft production and service methodology.
Figure 7:
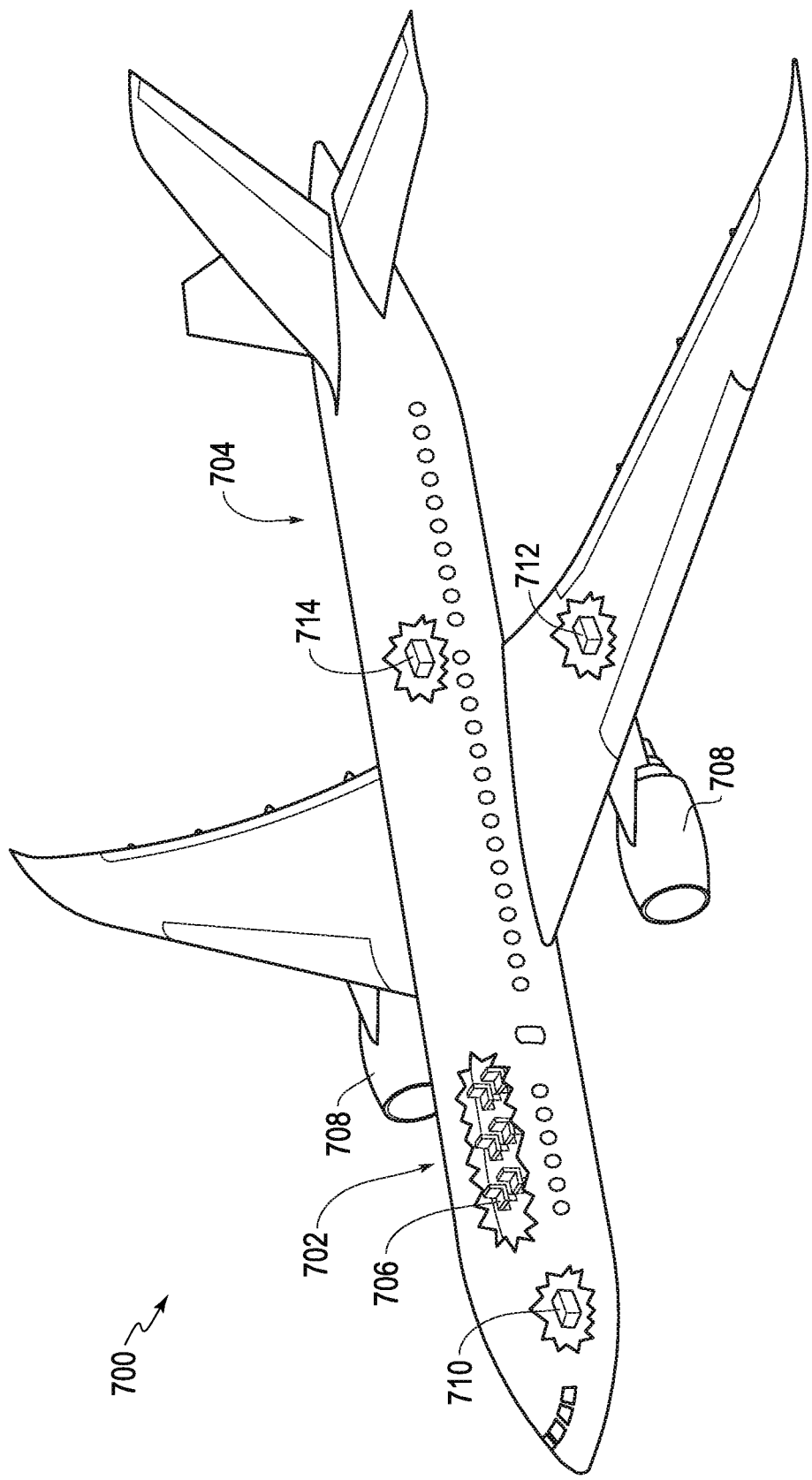
FIG. 7 is a schematic perspective view of an aircraft.

Examples of the disclosure may be described in the context of an aircraft manufacturing and service method 600 as shown in FIG. 6 and an aircraft 700 as shown in FIG. 7. During pre-production, illustrative method 600 may include specification and design 602 of the aircraft 700 and material procurement 604. During production, component and subassembly manufacturing 606 and system integration 608 of the aircraft 700 take place. Thereafter, the aircraft 700 may go through certification and delivery 610 to be placed in service 612. While in service by a customer, the aircraft 700 is scheduled for routine maintenance and service 614 (which may also include modification, reconfiguration, refurbishment, and so on).

Each of the processes of the illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 7, the aircraft 700 produced by the illustrative method 600 may include an airframe 702 with a plurality of high-level systems 704 and an interior 706. Examples of high-level systems 704 include one or more of a propulsion system 708, an electrical system 710, a hydraulic system 712, and an environmental system 714. Any number of other systems may be included. Although an aerospace example is shown, the principles may be applied to other industries, such as the automotive industry.

Apparatus and methods shown or described herein may be employed during any one or more of the stages of the manufacturing and service method 600. For example, components or subassemblies corresponding to component and subassembly manufacturing 606 may be fabricated or manufactured in a manner similar to components or subassemblies produced while the aircraft 700 is in service. Also, one or more aspects of the apparatus, method, or combination thereof may be utilized during the production states 606 and 608, for example, by substantially expediting assembly of or reducing the cost of an aircraft 700. Similarly, one or more aspects of the apparatus or method realizations, or a combination thereof, may be utilized, for example and without limitation, while the aircraft 700 is in service, e.g., maintenance and service 614.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "subsystem," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, electrically erasable programmable ROM (EPROM) memory, electrically erasable programmable ROM (EEPROM) memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A computing device comprising:
 a user interface having a user input to receive a command to modify a set of traffic filtering rules; and a filtering rule generator having a generation module configured to:
  identify traffic filtering rules using a defined quality metric;
  select a subset of the traffic filtering rules using the defined quality metric; and
  regenerate the set of traffic filtering rules as a new set of traffic filtering rules using only the subset of the traffic filtering rules to merge or split at least some of the traffic filtering rules in the subset of the traffic filtering rules.

2. The computing device of claim 1, wherein the defined quality metric is a value determined in part by a number of distinct data flows permitted by an existing traffic filtering rule.

3. The computing device of claim 2, wherein the value is defined by $Q(r)=n/m$, where r is a corresponding rule, n is a number of distinct flows allowed by r, and m is a desired number of distinct flows.

4. The computing device of claim 1, wherein the filtering rule generator is further configured to regenerate the set of traffic filtering rules for at least one cyber-physical system onboard an airplane.

5. The computing device of claim 1, wherein the generation module is further configured to merge at least some of the traffic filtering rules in the subset of the traffic filtering rules by selecting two rules among rules with same source and destination IP addresses with the most nearby ports and merging the two rules into a new rule defined by a merged port range that encompasses the two rules.

6. The computing device of claim 1, wherein the generation module is further configured to split at least some of the traffic filtering rules in the subset of the traffic filtering rules by determining traffic rules having a highest quality metric that defines a lowest level of data flow restriction.

7. The computing device of claim 1, wherein the command is a user input value to increase or decrease a number of rules in the set of traffic filtering rules.

8. A computer implemented aircraft data traffic flow filtering method comprising:
  determining with a computing device, a subset of traffic filtering rules from a set of traffic filtering rules that satisfy a quality metric defined by a ratio related to a number of distinct data flows for each of the traffic filtering rules; and
  regenerating a new set of traffic filtering rules by merging or splitting traffic filtering rules only within the subset of the traffic filtering rules.

9. The computer implemented aircraft data traffic flow filtering method of claim 8, further comprising determining a closeness of a calculated value of the quality metric for each traffic filtering rule within the subset of the traffic filtering rules to a predetermined value to merge or split the traffic filtering rules within the subset of the traffic filtering rules.

10. The computer implemented aircraft data traffic flow filtering method of claim 9, wherein the value is defined by $Q(r)=n/m$, where r is a corresponding rule, n is a number of distinct flows allowed by r, and m is a desired number of distinct flows.

11. The computer implemented aircraft data traffic flow filtering method of claim 8, further comprising receiving a user input value defining a change in a number of traffic filtering rules to be in the new set of traffic filtering rules to thereby define a new overall system security level.

12. The computer implemented aircraft data traffic flow filtering method of claim 8, wherein the set of traffic filtering rules comprises rules for at least one cyber-physical system onboard an airplane.

13. A computer-readable storage device storing instructions that, when executed by a processor, cause the processor to perform operations comprising:
  identifying traffic filtering rules in a set of traffic filtering rules using a quality metric;
  selecting a subset of the traffic filtering rules using the quality metric; and
  regenerating the set of traffic filtering rules as a new set of traffic filtering rules using only the subset of the traffic filtering rules to merge or split at least some of the traffic filtering rules in the subset of the traffic filtering rules.

14. The computer-readable storage device of claim 13, wherein the operations further comprise receiving a command to modify the traffic filtering rules.

15. The computer-readable storage device of claim 14, wherein the operations further comprise identifying whether the command is an instruction to increase or decrease a number of traffic filtering rules.

16. The computer-readable storage device of claim 15, wherein the subset of the traffic filtering rules are merged responsive to the command being an instruction to decrease the number of traffic filtering rules.

17. The computer-readable storage device of claim 15, wherein the subset of the traffic filtering rules are split responsive to the command being an instruction to increase the number of traffic filtering rules.

18. The computer-readable storage device of claim 13, wherein a first traffic filtering rule of the traffic filtering rules is selected responsive to a corresponding value of the quality metric being closest to a particular value of all corresponding values of the traffic filtering rules.

19. The computer-readable storage device of claim 13, wherein merging comprises selecting two traffic filtering rules among rules with same source and destination Internet Protocol addresses with the closest ports and merging the two traffic filtering rules into a new rule defined by a merged port range that encompasses the two traffic filtering rules.

20. The computer-readable storage device of claim 13, wherein identifying the quality metric results in a value, and wherein a rule with a higher value than another rule indicates a lower security level in data traffic flow.

* * * * *